FIG. 4

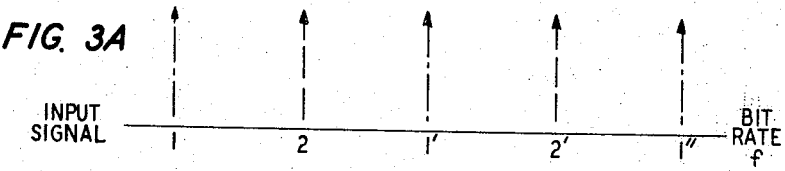
FIG. 3A INPUT SIGNAL — BIT RATE f
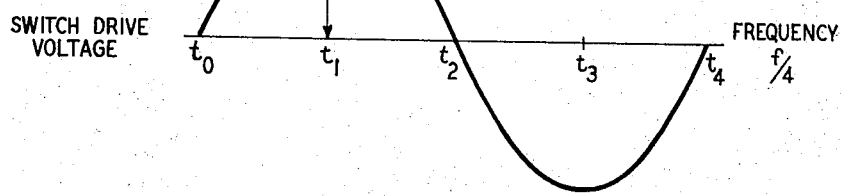
FIG. 3B SWITCH DRIVE VOLTAGE — FREQUENCY f/4
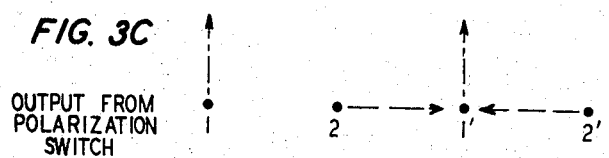
FIG. 3C OUTPUT FROM POLARIZATION SWITCH
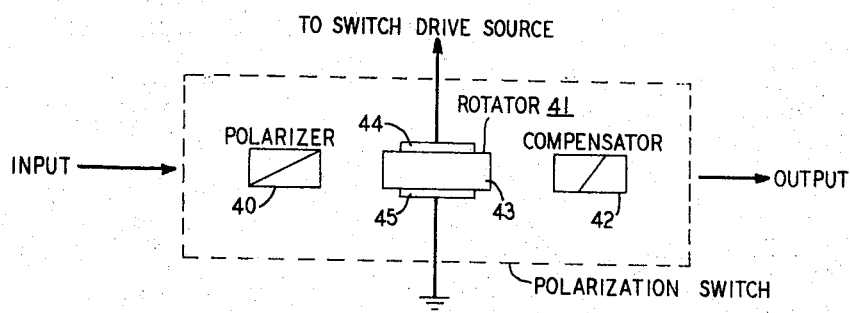
FIG. 5
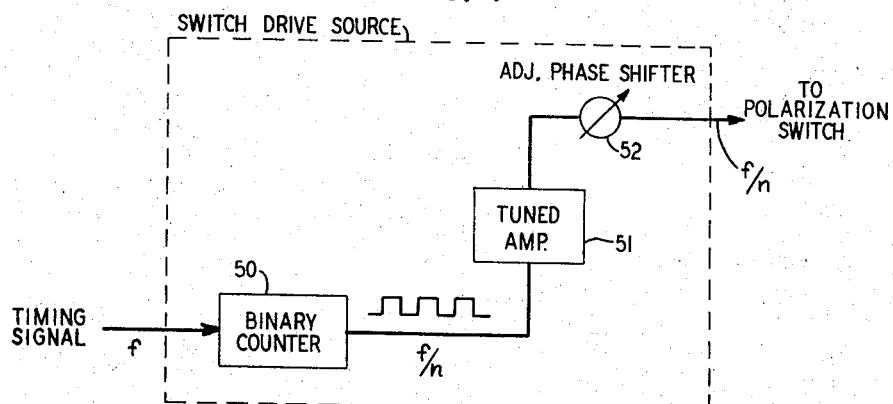
FIG. 7

Oct. 6, 1970    R. T. DENTON    3,532,890
OPTICAL MULTIPLEXING AND DEMULTIPLEXING SYSTEMS
Filed Sept. 11, 1967    6 Sheets-Sheet 5

INPUT SIGNAL TO POLARIZATION SWITCH

SWITCH DRIVE VOLTAGE

OUTPUT FROM POLARIZATION SWITCH

INPUT SIGNAL TO POLARIZATION SWITCH

SWITCH DRIVE VOLTAGE

OUTPUT FROM POLARIZATION SWITCH

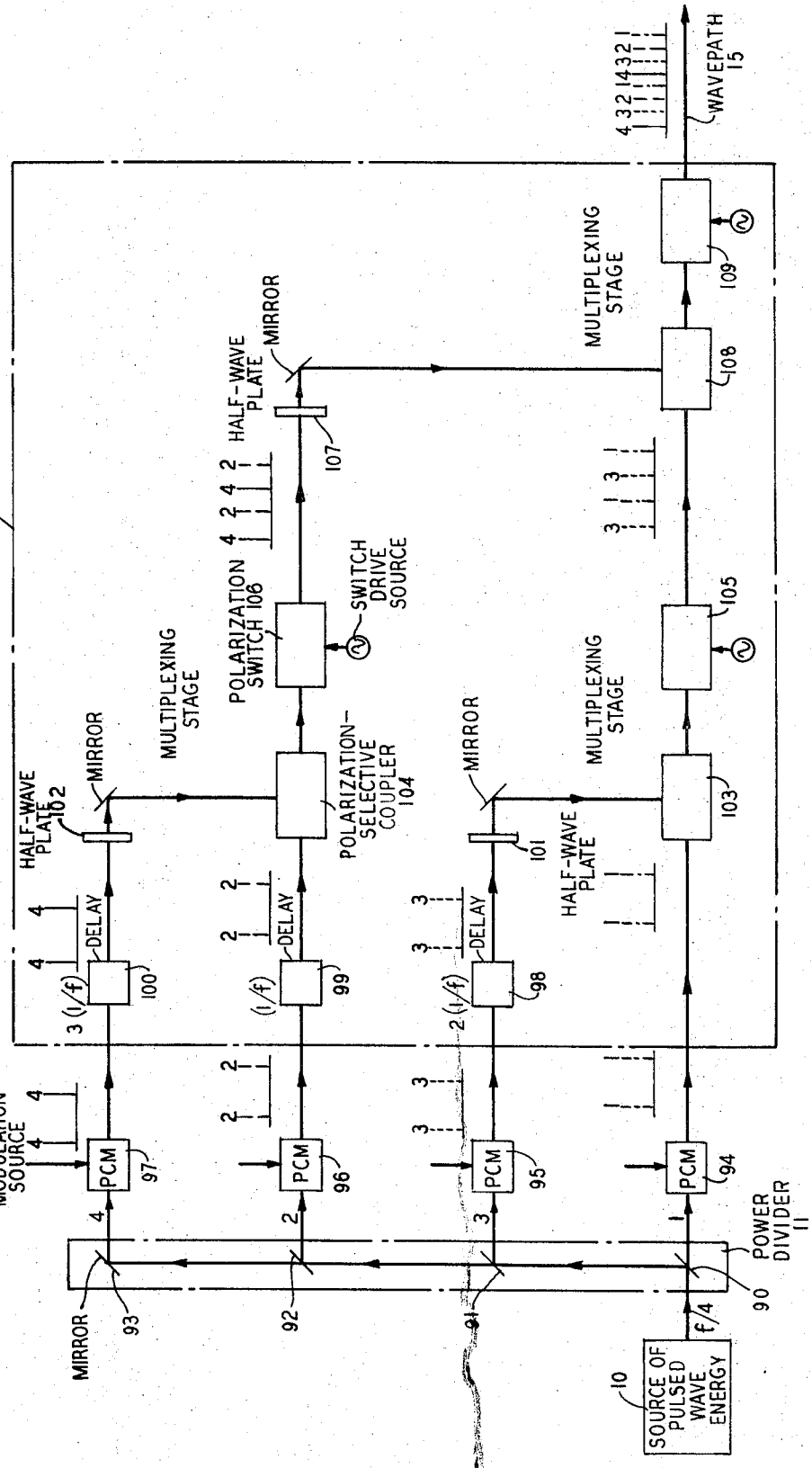

United States Patent Office 3,532,890
Patented Oct. 6, 1970

3,532,890
OPTICAL MULTIPLEXING AND DEMULTIPLEXING SYSTEMS
Richard T. Denton, South Plainfield, N.J., assignor to Bell Telephone Laboratories, Incorporated, Murray Hill, N.J., a corporation of New York
Continuation-in-part of application Ser. No. 579,101, Sept. 13, 1966. This application Sept. 11, 1967, Ser. No. 666,589
Int. Cl. H04b 9/00
U.S. Cl. 250—199                                    12 Claims

ABSTRACT OF THE DISCLOSURE

This application describes optical multiplexer and demultiplexer circuits, each of which includes a polarization switch and a polarization-selective coupler. The switch, which is operated at a subharmonic of the bit rate of the PCM signal applied thereto, rotates the direction of polarization of selected pulses 90 degrees. At the transmitter, the polarization-selective coupler functions as a channel combiner, multiplexing orthogonally-polarized signals for propagation along a common wavepath. At the receiver, the polarization-selective coupler functions as a channel separator, demultiplexing orthogonally-polarized signals for propagation along two separate wavepaths.

Multiplexing and demultiplexing is accomplished using a plurality of separate stages, arranged in successive levels.

---

This application is a continuation-in-part of my copending application Ser. No. 579,101, filed Sept. 13, 1966.

BACKGROUND OF THE INVENTION

This invention relates to multiplexing and demultiplexing apparatus for use in optical pulse code modulation (PCM) communication systems.

One of the purposes of the multiplexing technique is to increase the information-handling capacity of a communication system. It is inevitable, therefore, that this technique will be adapted and used in optical pulse code modulation systems, where the designation "optical" includes the infrared, the visible and the ultraviolet portions of the frequency spectrum.

In a time-division multiplexed communication system, to which the invention relates, a single transmission facility serves as a transmission link for a number of pulse-encoded signals. In such a system, the pulse trains, representing each of $p$ pulse-encoded signals to be transmitted, are interleaved with each other in a predetermined manner to form a single pulse train having a bit rate that is $p$ times greater than that of any of the individual channels. The process of interleaving is known as multiplexing.

At the receiver, the several PCM channels that had been interleaved and transmitted together, are separated and individually decoded. The process of separating is known as demultiplexing.

SUMMARY OF THE INVENTION

In order to handle the high bit rates that are possible in an optical system, it is almost essential that both multiplexing and demultiplexing be done optically.

In accordance with the present invention, both multiplexing and demultiplexing is accomplished in successive levels, where the number of levels depends upon the number of channels present. The several levels include one or more stages, each of which comprises an optical polarization switch, a switch drive source, which operates the switch at a rate that is a subharmonic of the signal bit rate, and an optical polarization-selective coupler. The latter functions, at the transmitter, as a channel combiner. At the receiver, it operates as a channel separator.

In the embodiment of a transmitter to be described below, a single train of optical pulses, having a pulse repetition rate $f/p$, is divided by means of a plurality of graded beam splitters into $p$ separate pulse trains, where $p$ is the number of desired channels, and $f$ is the bit rate of the multiplexed signal. Each pulse train is separately modulated, in accordance with the information to be transmitted, and each is delayed in time relative to the other pulse trains so that they are spaced apart intervals of time $t=1/f$ in order to interleave properly.

Means are located in the path of selected channels for rotating the direction of polarization of the beam in the respective channels 90 degrees relative to the direction of polarization of the beams in the other channels. Each of the rotated channels is then combined with one of the other channels in a multiplexing stage consisting of a polarization-selective coupler, which combines the two separate, orthogonally-directed pulse trains along a common beam direction, and a polarization switch, which realigns the polarization of the two, combined channels along a common direction of polarization.

The process of multiplexing is continued in this manner in a succession of multiplexing levels until all channels are combined into a common pulse train having a pulse repetition rate $f$.

At the receiver the process is reversed, with the various channels in the received signal being successively divided out by means of similar, polarization-selective circuits operating in a reverse manner. For example, the polarization switch in a demultiplexing stage rotates the polarization of selected pulses in the input signal by 90 degrees. The optical pulses derived from the switch are then separated by a polarization-selective coupler into two separate optical beams, each of which now contains a fraction of the signal channels present in the input beam. In a simple two-channel system, demultiplexing would, at this stage, be complete. More generally, however, each of the two output beams is coupled to additional demultiplexing stages until, by successive divisions, the process is completed, and all the channels have been completely separated.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIGS. 3A, 3B and 3C, included for purposes of explanation, show the polarization of the input optical signal pulses, the polarization switch drive voltage, and the direction of polarization of the output optical signal pulses derived from the polarization switch for the embodiment of the invention shown in FIG. 2;

FIG. 4 shows, in block diagram, a three-stage, four-channel demultiplexer;

FIG. 5 shows, in block diagram, the details of a polarization switch;

FIG. 7 shows, in block diagram, the details of the switch drive source;

FIG. 9 shows a four-channel multiplexer, in accordance with the invention.

Referring to the drawings, FIG. 1 shows, in block diagram, the elements of a time-multiplexed, pulse code modulation communication system. Typically, the system includes, at the transmitter end: a source 10 of pulsed wave energy; a power divider 11 for dividing the incident pulse train derived from source 10 into $p$ separate pulse trains, or channels; $p$ separate pulse code modulators 12; and multiplexing means 13 for combining the separate channels in a manner to permit propagation along a common wavepath 15.

At the receiver end of wavepath 15, the multiplexed signal is demultiplexed by means of a demultiplexer 14. The resulting $p$ output signal channels are then separately available for further utilization in accordance with the requirements of the particular communication system.

In accordance with the present invention, multiplexing and demultiplexing are accomplished in successive levels where the number of levels required depends upon the number of channels involved. For example, it requires $n$ levels of multiplexing or demultiplexing, to handle $2^n$ channels. More generally, it takes $n+2m$ levels to handle $2^n \cdot 3^m$ channels, where $n$ and $m$ are integers.

Figure 2:
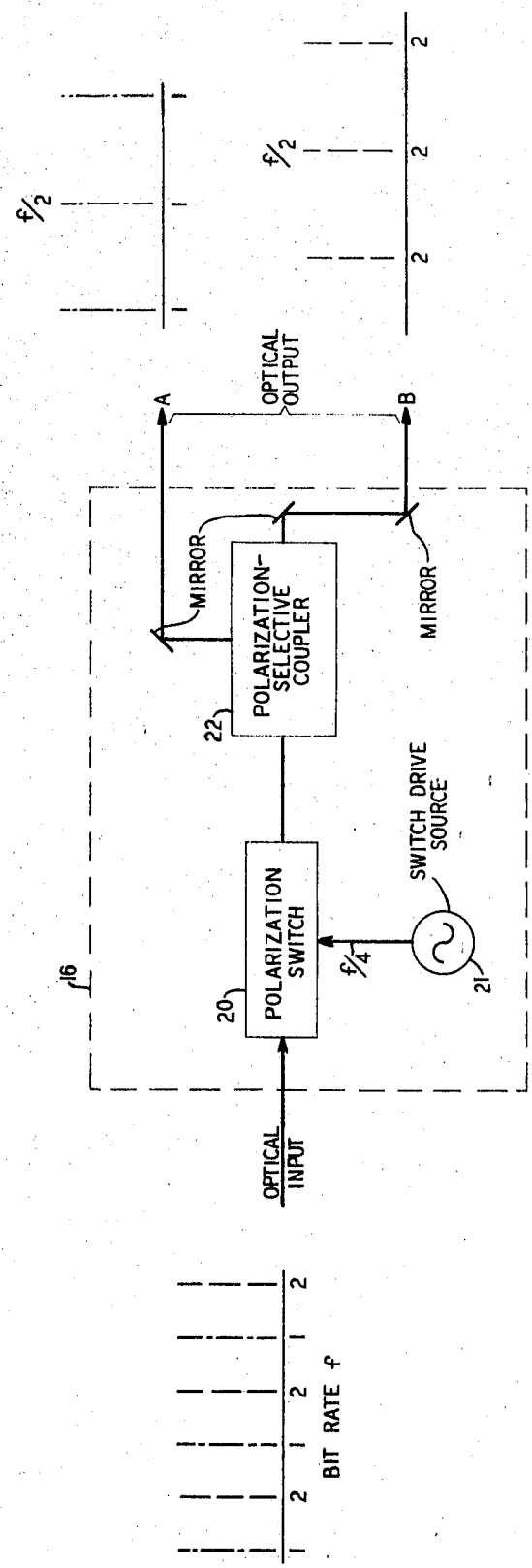
FIG. 2 shows, in block diagram, a demultiplexer in accordance with the invention.

In the discussion that follows, apparatus, in accordance with the invention, for performing the multiplexing and demultiplexing functions are described in greater detail, starting with the basic multiplexing-demultiplexing stage 16 illustrated in block diagram in FIG. 2. As will become apparent, this circuit is capable of performing either as a multiplexer or as a demultiplexer, depending upon the direction of signal flow therethrough. In FIG. 2, operation as a demultiplexer is illustrated, and is herein described. It will be understood that while only one stage is illustrated in FIG. 2, in practice additional stages would be employed in sufficient number to complete the demultiplexing process, as will also be explained in greater detail hereinbelow.

As shown, a typical stage comprises a polarization switch 20, a switch drive source 21, and a polarization-selective coupler 22. For purposes of explanation, a two-channel input signal is illustrated, with the pulses associated with one of the channels indicated by the broken lines designated 1, and the pulses associated with the other channel indicated by the dashed lines designated 2. Since a demultiplexer, in accordance with the present invention, operates by selectively rotating the direction of polarization of some of the optical pulses, the input signal applied to polarization switch 20 is advantageously passed through a polarizer (not shown) to align the polarization of each pulse along the same direction. FIG. 3A shows the input pulses applied to the polarization switch all aligned in the same direction, as indicated by the arrowheads.

In operation, the polarization switch is activated by means of a suitable drive voltage so as to rotate the polarization of every other pulse 90 degrees. One method by which this can be accomplished is by means of a sinusoidal voltage whose frequency is one-fourth the bit rate of the signal, synchronized with the pulse train as illustrated in FIG. 3B.

At time $t_0$, the voltage applied to the polarization switch is zero, and optical pulse 1 traverses the polarization switch with its direction of polarization unaltered, as indicated in FIG. 3C. At $t_1$, however, the voltage applied to the polarization switch is a maximum V resulting in a 90 degree rotation in the direction of polarization of optical pulse 2, as represented by the horizontal pulse 2 in FIG. 3C. At time $t_2$ the drive voltage is again zero, permitting the next optical pulse 1' to traverse the polarization switch unaltered. Similarly, pulse 2' at time $t_3$ is rotated 90 degrees, whereas pulse 1" at $t_4$ propagates through the switch unaltered.

As a result of the above-described polarization switching, the output from switch 20 comprises a train of pulses in which adjacent pulses have their directions of polarization rotated 90 degrees relative to each other. Thus, in a two-channel system, such as is described above, all the pulses associated with one of the channels are aligned along one direction, whereas the pulses associated with the other channel are aligned at 90 degrees to the first channel. With this polarization orientation, it is a simple matter to physically separate the two channels by passing the output beam from the polarization switch through polarization-selective coupler 22, as shown in FIG. 2. The coupler, which can be, for example, a Glan-Thompson prism (such as described at page 502 of "Fundamentals of Optics," by F. A. Jenkens and H. E. White, Third Edition, published by the McGraw-Hill Book Company, Inc. 1957) separates the multiplexed signal into two separate beams A and B, each of which contains one of the two channels. In a two-channel system this completes the demultiplexing process.

Figure 4:
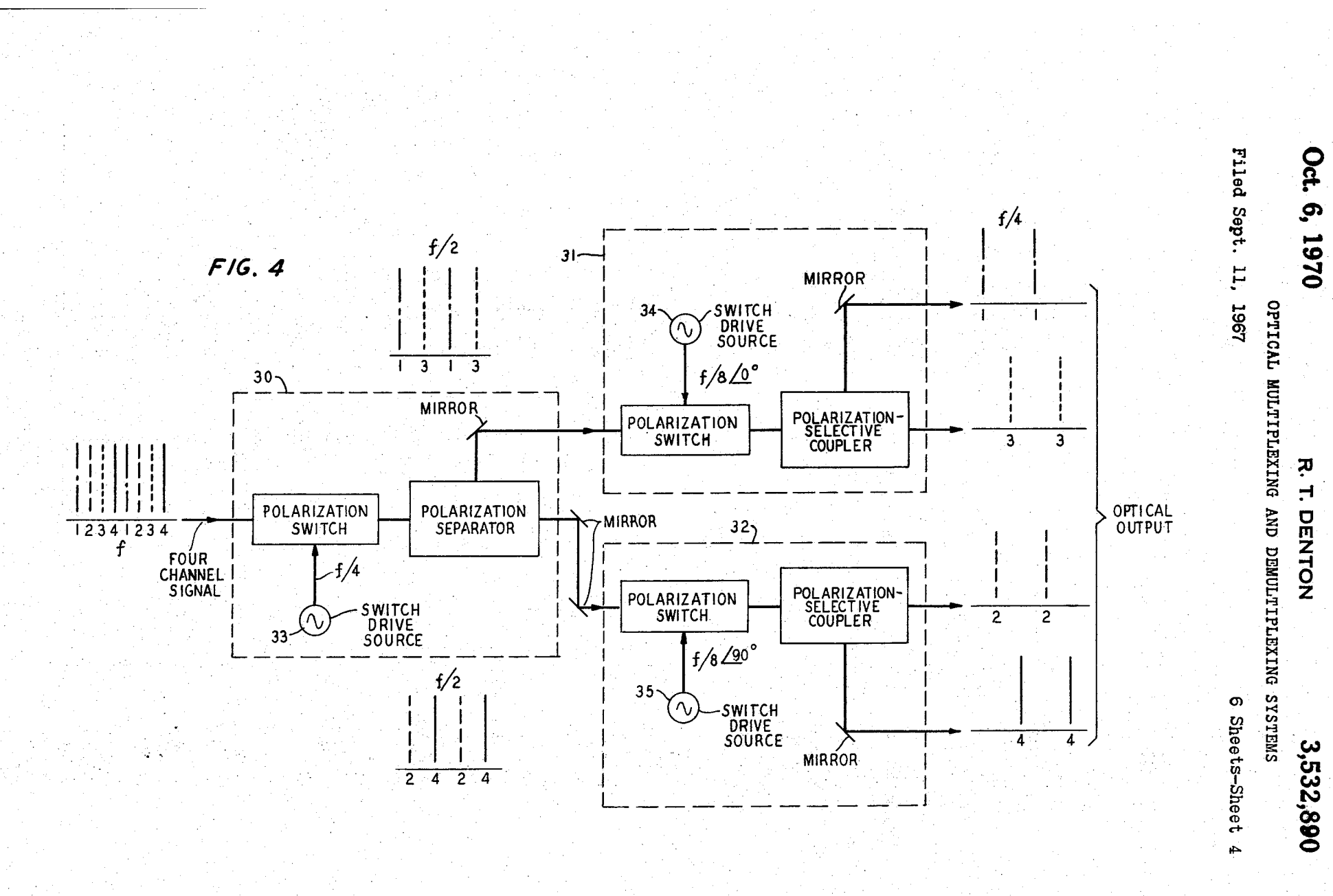

FIG. 4 illustrates the use of three demultiplexing stages 30, 31 and 32 for demultiplexing a four-channel signal. In this arrangement, the first stage 30 divides the four-channel signal into two, two-channel signals. One of these signals, containing channels 1 and 3, is coupled in turn to stage 31 wherein these two channels are separated. Similarly, the other two-channel signal, containing channels 2 and 4, is coupled to stage 32, and separated.

It will be noted that in each stage of this illustrative embodiment the frequency of the signal provided by the switch drive source is one-fourth the bit rate of the optical signal. Designating the bit rate of the four-channel signal applied to stage 30 as $f$, switch drive source 33 operates at a frequency $f/4$. As the bit rate of each of the signals coupled to stages 31 and 32, respectively, is $f/2$, the frequency of the signal provided by each of the drive sources 34 and 35 is $f/8$. In addition, the sinusoidal drives for these two latter stages are 90 degrees out of phase because of the time displacements of channels 1 and 3 relative to channels 2 and 4.

It is a straightforward extension of these techniques to demultiplex eight or sixteen channel signals. In general, it takes $n$ levels of demultiplexing, employing $2^n-1$ demultiplexing stages, to separate a $2^n$ channel signal, where, for example, in FIG. 4, stage 30 is considered the first level, and stages 31 and 32 are considered the second level of demultiplexing.

The polarization switch can be constructed of any one of the many electro- or magneto-optical devices known in the art that are capable of rotating the polarization of optical waves. FIG. 5 is illustrative of one such arrangement including a Glan-Thompson polarizer 40, a rotator 41, comprising a length of electro-optic material 43, such as lithium tantalate ($LiTaO_3$), disposed between a pair of electrodes 44 and 45, and a Babinet compensator 42 (see page 559 of the above-cited book "Fundamentals of Optics"). In this illustrative example, a polarizer is included as part of the polarization switch.

In one mode of operation, the compensator 42 is adjusted such that there is no net rotation in the direction of polarization of the optical pulses when the switch drive voltage across rotator 41 is zero. This corresponds to conditions at times $t_0$, $t_2$, $t_4$ et cetera in FIG. 3B. A 90 degree rotation at times $t_1$, $t_3$ et cetera is obtained by adjusting the length of the lithium tantalate crystal and the amplitude of the switch drive voltage V.

Figure 6A:
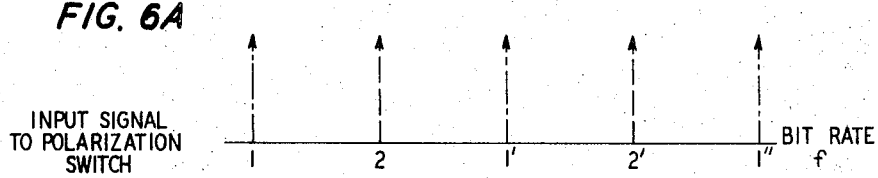
FIGS. 6A, 6B and 6C, included for purposes of explanation, illustrate an alternate mode of operation of a polarization switch.
Figure 6B:
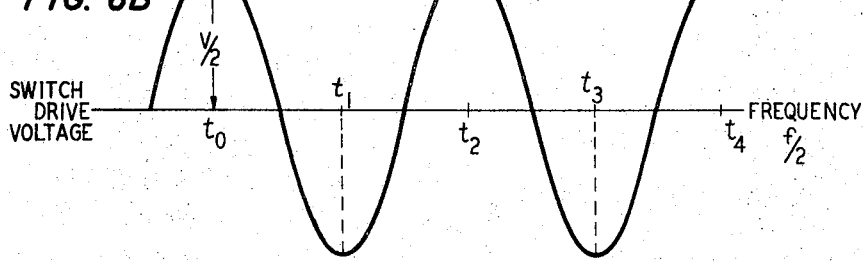
Figure 6C:
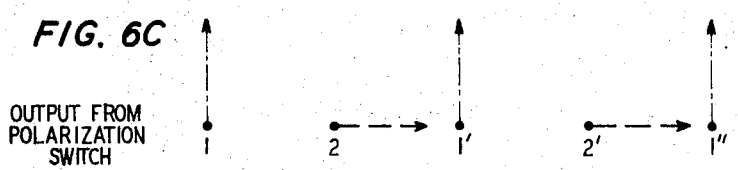

In a second mode of operation, the compensator is adjusted to provide $\pi/2$ relative phase shift between wave components polarized along directions which correspond to the extraordinary and ordinary wave directions in the electro-optical material. When the optical system is biased in this manner the switch is driven in a somewhat different manner than was described hereinabove with respect to the embodiments illustrated in FIGS. 2 and 4. In this second mode of operation, the switch is driven at one-half the bit rate, and the drive voltage is synchronized relative to the optical pulse train such that the voltage across the rotator 41 is a maximum at each pulse position, as illustrated in FIGS. 6A and 6B. The length of the electro-optic material and the voltage across it are adjusted such that the rotator introduces an additional $\pi/2$ phase shift between the extraordinary and the ordinary wave components where the sense of the phase shift is a function of the polarity of the drive voltage. Thus, at time $t_0$ the rotator introduces a $\pi 2$ relative phase shift between the extraordinary and ordinary wave components which is in the opposite sense to the phase shift introduced by the compensator. The net result is that pulse 1 traverses the polarization switch with its direction of polarization unchanged, as indicated in FIG. 6C. At time $t_1$, the direction of the switch drive voltage is reversed. As a result, the $\pi/2$ relative phase shift between the extraordinary and ordinary waves introduced in the rotator is now in the same sense as that produced in the compensator, making a total phase shift of $\pi$ radians. Consequently, the direction of polarization of pulse 2 is rotated 90 degrees, as shown in FIG. 6C. Similarly, pulses 1' and 1'' are unaltered, whereas pulse 2' is rotated 90 degrees.

While the frequency of the drive source for this second mode of operation is twice that of the first mode of operation, described with reference to FIGS. 3A, 3B and 3C, the amplitude of the drive voltage required is only one-half as much for the same length electro-optic crystal.

FIG. 7 shows the details of an illustrative switch drive source comprising a binary counter 50, a tuned amplifier 51, and an adjustable phase shifter 52. In operation, a timing signal generated either locally at the receiver, or derived from the input signal, is coupled to the binary counter. The latter generates a square wave signal at a subharmonic, $f/q$, of the bit rate of the timing signal. The tuned amplifier filters and amplifies the square wave to provide an essentially sinusoidal signal, at a subharmonic of the signal bit rate, to operate the polarization switch.

Figure 8A:
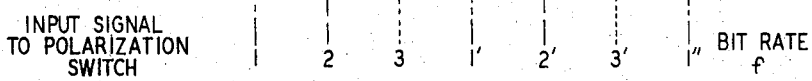
FIGS. 8A, 8B and 8C, included for purposes of explanation, illustrate the operation of a polarization switch for a three-channel signal.
Figure 8B:
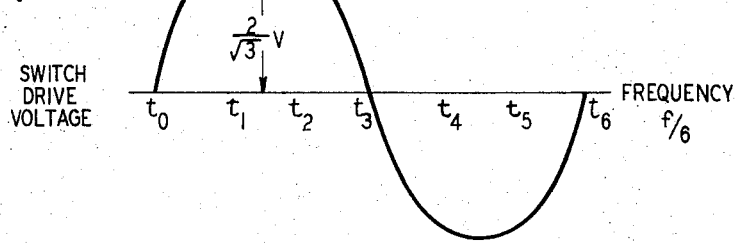
Figure 8C:
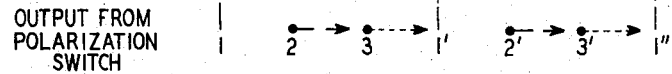

In the above discussion multiplexed systems containing $2^n$ signal channels have been considered where in at the output of each demultiplexing level the number of separated channels is doubled. The present invention can also be used in a three-channel multiplexed system, as illustrated in FIGS. 8A, 8B and 8C, which show, respectively, the directions of polarization of the pulses associated with the three signals, the switch drive voltage, and the directions of polarization of the output pulses. In this third mode of operation, the frequency of the drive signal is one-sixth the signal bit rate, and the amplitude of the drive voltage is $$\frac{2}{\sqrt{3}}$$

times the amplitude of the voltage required by the arrangement described with reference to FIGS. 3A, 3B and 3C.

In operation, the channel 1 pulses have their direction of polarization unaltered by the polarization switch, whereas the channel 2 and channel 3 pulses are rotated 90 degrees. The latter two channels are then separated by means of a second demultiplexing stage operating in the manner just described.

The third switching mode described in connection with FIGS. 8A, 8B and 8C is used in those systems wherein the number of channels is given by $2^n \cdot 3^m$, where $n$ and $m$ are integers. Such a system would require $(2^n \cdot 3^m - 1)$ demultiplexing stages arranged in $n + 2m$ levels. Thus, in a $24 = 2^3 \cdot 3^1$ channel system, wherein $n=3$ and $m=1$, there are a total of $(2^3 \cdot 3 - 1) = 23$ stages arranged in $(n+2m) = 5$ levels of demultiplexing. One way of implementing the demultiplexer uses $(2^n - 1) = 7$ stages, arranged in three levels, operating in either of the switching modes described in connection with FIGS. 3A, 3B and 3C, or FIGS. 6A, 6B and 6C. The remaining 16 following stages, arranged in two levels, operate in the switching mode described in connection with FIGS. 8A, 8B and 8C. Alternatively, two stages operating in the third switching mode can be used, followed by 21 stages operating in either the first or second switching mode. Similarly, other combinations of demultiplexing stages can readily be devised using the same total number of stages.

Figure 1:
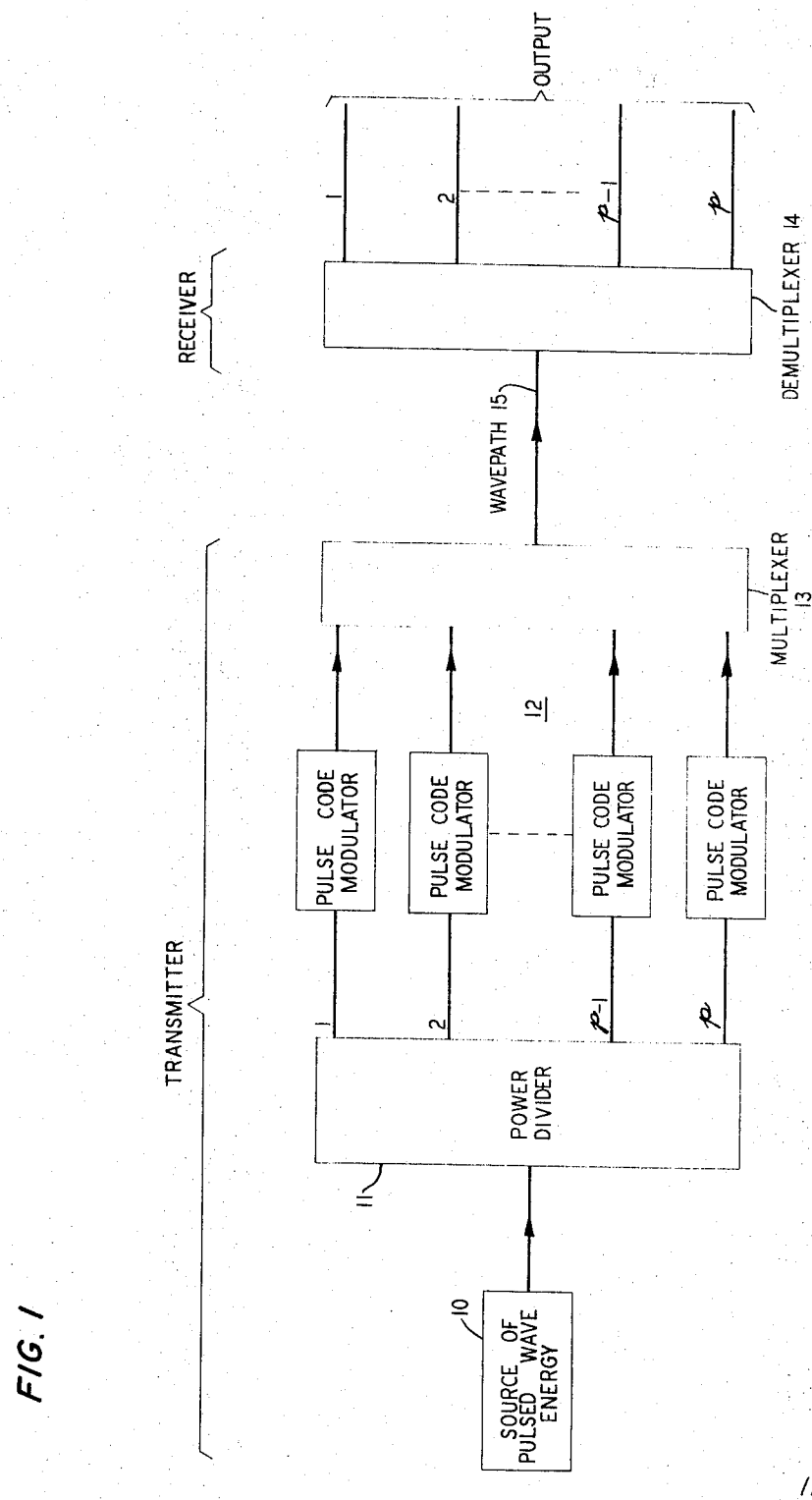
FIG. 1 shows, in block diagram, the elements of a time-multiplexed, PCM communication system.

Multiplexing, in accordance with the invention, is accomplished in a similar manner as demultiplexing, utilizing an arrangement of demultiplexing stages in reverse. This is illustrated in FIG. 9, which shows, in block diagram, details of the transmitter of FIG. 1. Included in the figure is a source 10 of pulsed wave energy which, in an optical system, can be a phase-locked laser operating at a pulse repetition rate equal to the system bit rate, $f$, divided by the number of channels, $p$. In the four-channel system illustrated, source 10 operates at a pulse repetition rate $f/4$.

The output of source 10 is directed into power divider 11, comprising an array of three graded beam splitters 90, 91 and 92 and a mirror 93, wherein the laser output is divided into four beams of equal intensity. Each of the beams is, in turn, modulated by one of the optical pulse code modulators 94, 95, 96 or 97, each of which is activated by a separate modulation source (not shown). Suitable modulators for this purpose are described in an article by R. T. Denton et al., entitled "224 mc. per second Optical Code Modulator" published in the October 1966 issue of the Proceedings of the IEEE, at pages 472–473.

At this point in the system, all the channels, which have the same bit rate, are approximately in time phase. However, in order to properly interleave the channels in the multiplexer, time delays are introduced in three of the four channels. In general, in a p-channel system, the delays in the several channels differ by units of time equal to $$\frac{1}{p(f/p)} = \frac{1}{f}$$

Using channel 1 as the reference channel, two units of delay are introduced into channel 2; one unit in channel 3; and three units in channel 4. In practice, the relative delays amog the several channels are determined by the optical path lengths of the channels. However, in FIG. 9, the delays introduced are represented by lumped elements 98, 99 and 100, following the modulators.

It will be recalled that in the demultiplexer two orthogonally-polarized pulse trains, propagating along a common wavepath, are separated into two different wavepaths by means of a polarization-selective coupler. In the multiplexer, the polarization-selective coupler is used to perform the reverse function. That is, two orthogonally-polarized pulse trains are combined by the coupler in a common wavepath. Thus, in FIG. 9, means, such as half-wave plates 101 and 102 are located in two of the channels 3 and 4, to rotate the polarization of the pulses in these channels 90 degrees relative to the direction of polarization of the pulses in channels 1 and 2. So oriented, channels 1 and 3 are combined along a common path by means of polarization-selective coupler 103, while channels 2 and 4 are combined along a common path by means of coupler 104. The polarizations of the combined signals are then realigned along a common direction by means of polarization switches 105 and 106 operating in either of the two modes described with reference to FIGS. 3A, 3B and 3C, or FIGS. 6A, 6B and 6C.

The process is then repeated in a second level of multiplexing which includes half-wave plate 107, coupler 108 and switch 109. The resulting four-channel, time-multiplexed signal thus obtained is capable of propagating along common wavepath 15.

It is apparent that the invention is not limited to optical signals, but can just as readily be practiced at lower frequencies. Similarly, the invention is not limited to the particular methods disclosed for generating and modulating the signals in the several channels. Thus in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A multiplexed, pulse code modulation communication system including:
at a transmitter, a succession of multiplexing stages for multiplexing a plurality of pulse-encoded signals, each of which stages comprises:
means for rotating 90 degrees the direction of polarization of at least one of said signals relative to the direction of polarization of another of said signals;
polarization-selection means for combining said orthogonally-polarized signals for propagation along a common wavepath; and
means for realigning the polarization of said signals along a common direction;
at a receiver, a succession of demultiplexing stages, each of which comprises:
means for selectively rotating 90 degrees the direction of polarization of at least one of said multiplexed signals relative to the direction of polarization of another of said signals; and
polarization-selective means for separating said orthogonally-polarized signals for propagation along two separate wavepaths.

2. The system according to claim 1 wherein $2^n \cdot 3^m$ signals are multiplexed by means of ($2^n \cdot 3^m - 1$) multiplexing stages arranged in $n+2m$ levels of multiplexing, where $n$ and $m$ are integers including zero.

3. The system according to claim 1 wherein $2^n \cdot 3^m$ signals are demultiplexed by means of ($2^n \cdot 3^m - 1$) demultiplexing stages arranged in $n+2m$ levels of demultiplexing, where $n$ and $m$ are integers including zero.

4. In a pulse code modulation communication system operating at a specified bit rate $f$ and adapted to transmit $2^n \cdot 3^m$ multiplexed signals, where $n$ and $m$ are integers including zero, a multiplexing arrangement including ($2^n \cdot 3^m - 1$) multiplexing stages arranged in $n+2m$ levels of multiplexing, wherein each stage comprises:
means for producing a 90 degree difference in the direction of polarization of two of said signals;
polarization-selective means for combining said orthogonally-polarized signals for propagation along a common wavepath; and
a polarization switch for realigning the polarization of said signals along a common direction.

5. The multiplexer according to claim 4 wherein said polarization switch operates at one-half the bit rate of the signal propagating therethrough.

6. The multiplexer according to claim 4 wherein said polarization switch operates at one-fourth the bit rate of the signal propagating therethrough.

7. The multiplexer according to claim 4 wherein said polarization switch operates at one-sixth the bit rate of the signal propagating therethrough.

8. The system according to claim 4 including, in addition:
a pulse source having a bit rate equal to $f/2^n \cdot 3^m$;
means for dividing the pulses derived from said source into $2^n \cdot 3^m$ separate signals;
means for modulating each of said separate signals;
and means for producing a relative time delay between said signals equal to multiples of $1/f$.

9. In a pulse code modulation communication system adapted to transmit $2^n \cdot 3^m$ multiplexed signals, where $n$ and $m$ are integers including zero, a demultiplexing arrangement including:
($2^n \cdot 3^m - 1$) demultiplexing stages arranged in $n+2m$ levels of demultiplexing, wherein each stage comprises:
a polarization switch for producing a 90 degree difference in the direction of polarization of at least one of said multiplexed signals relative to the direction of polarization of another of said signals; and
polarization-selective means for separating said orthogonally-polarized signals for propogation along two separate wavepaths.

10. The demultiplexer according to claim 9 wherein said polarization switch operates at one-half the bit rate of the signal propagating therethrough.

11. The demultiplexer according to claim 9 wherein said polarization switch operates at one-fourth the bit rate of the signal propagating therethrough.

12. The demultiplexer according to claim 9 wherein said polarization switch operates at one-sixth the bit rate of the signal propagating therethrough.

References Cited

UNITED STATES PATENTS

| | | | |
|---|---|---|---|
| 3,272,988 | 9/1966 | Bloom et al. | 250—199 |
| 3,430,048 | 2/1969 | Rubenstein | 250—199 |

FOREIGN PATENTS

| | | |
|---|---|---|
| 675,357 | 7/1952 | Great Britain. |

OTHER REFERENCES

M. R. Wholers et al., Journal of Applied Physics, Control of Laser Radiation with Birefringent Crystals, February 1964, vol. 35, No. 8, Class 250/199.

ROBERT L. GRIFFIN, Primary Examiner

A. J. MAYER, Assistant Examiner

U.S. Cl. X.R.

350—150, 169